US007389391B2

United States Patent
Hsu et al.

(10) Patent No.: US 7,389,391 B2
(45) Date of Patent: Jun. 17, 2008

(54) MEMORY DISPOSITION METHODS AND SYSTEMS

(75) Inventors: Chia-Jung Hsu, Hsinchu (TW); Chih-Chyuan Hwang, Taipei (TW); Yann-Chang Lin, Hsin-Chu (TW)

(73) Assignee: Mediatek, Inc., Hsin-Chu (TW)

( * ) Notice: Subject to any disclaimer, the term of this patent is extended or adjusted under 35 U.S.C. 154(b) by 294 days.

(21) Appl. No.: 11/119,392

(22) Filed: Apr. 29, 2005

(65) Prior Publication Data

US 2006/0248291 A1    Nov. 2, 2006

(51) Int. Cl.
*G06F 12/00* (2006.01)
(52) U.S. Cl. .............. 711/154; 711/103; 711/100; 712/220; 712/32
(58) Field of Classification Search ........... 711/154, 711/103, 100; 712/220, 32
See application file for complete search history.

(56) References Cited

U.S. PATENT DOCUMENTS

| | | | |
|---|---|---|---|
| 5,938,766 A | 8/1999 | Anderson et al. | 713/100 |
| 6,212,632 B1 * | 4/2001 | Surine et al. | 713/2 |
| 2006/0075183 A1 * | 4/2006 | Lin et al. | 711/103 |

FOREIGN PATENT DOCUMENTS

JP      08137514      * 5/1996

OTHER PUBLICATIONS

German Office Action mailed Sep. 15, 2006.
CN Office Action mailed Jun. 1, 2007.

* cited by examiner

*Primary Examiner*—Kimberly McLean
(74) *Attorney, Agent, or Firm*—Thomas, Kayden, Horstemeyer & Risley

(57) ABSTRACT

A memory disposition system, comprising a first memory device and a second memory device. First and second memory devices are provided to a system, such as an embedded system. The first and the second memory devices are coupled to a control unit, such as micro control unit. The first memory device stores first programs and the second memory device second programs. The first and second programs are controlled by the control unit. The first memory device can be a one time programmable memory device, such as a ROM, and the second memory device a multiple times programmable memory device, such as a flash memory.

25 Claims, 5 Drawing Sheets

MEMORY DISPOSITION METHODS AND SYSTEMS

BACKGROUND

The invention relates to system control methods, and in particular to memory disposition methods and systems for a system with a control unit.

An embedded system generally comprises a combination of hardware and software, either fixed or programmable. Embedded systems are generally designed for specific application devices, such as mobile phones or personal digital assistants (PDAs). Thus, components of an embedded system are distinguished from a common computer system. For example, memory devices in an embedded system of an application device, such as a mobile phone, may be designed with limited size due to hardware limitations of the application device.

Conventionally, an embedded system has a control unit, such as a micro control unit (MCU), for system control and a memory device, such as a flash memory, for program storage. A collection of software programs is controlled by the control unit and stored in the memory device. If software programs are modified, they must be compiled, linked, and reloaded in the system, even though the modification may be minor.

FIG. 1 is a flowchart of an embodiment of a conventional software program control method. In the example, an embedded system has a control unit for software program control and a flash memory for software program storage. Software programs are modified (step S100). The software programs are compiled, and the relative addresses of the symbols (functions/data/variables) in the software programs are determined at compile time (step S102). The symbols are then linked to absolute addresses, which will not be changed at runtime (step S104). The modified software programs are reloaded in the flash memory (step S106).

FIG. 2 is a diagram of an embodiment of a conventional software program control system. The software program control system is employed in an embedded system with a control unit 204. For example, an embedded system with a MCU may be employed in a mobile phone for communication. A memory device 202 is provided and coupled to the control unit 204. The memory device 202, a flash memory, is a non-volatile memory and allowed to be programmed for multiple times. The memory device 202 is used for storing software programs. Furthermore, a random-access-memory (RAM) 206, which is a volatile memory, is provided to store run-time data. For the conventional embedded system, all software programs are stored in the flash memory 202, requiring large memory size. The cost of a multiple-time programmable memory device, such as a flash memory, is much higher than a one-time programmable memory device, such as read-only-memory (ROM). However, if whole software programs are stored in the ROM, it will not be flexible if some defects need to be fixed. Additionally, memory sizes are limited for most embedded systems. Thus, cost-reduced memory disposition methods and systems for an embedded system are desirable.

SUMMARY

An exemplary embodiment of a memory disposition system comprises first and second memory devices. The first memory device stores first programs and the second memory device, second programs. The first and second programs are controlled by a control unit of the computer system. The first memory device can be a one-time programmable memory device, such as a ROM. The second memory device can be a multiple-time programmable memory device, such as a flash memory.

DESCRIPTION OF THE DRAWINGS

The invention can be more fully understood by reading the subsequent detailed description and examples with references made to the accompanying drawings, wherein.

DESCRIPTION

Figure 3:
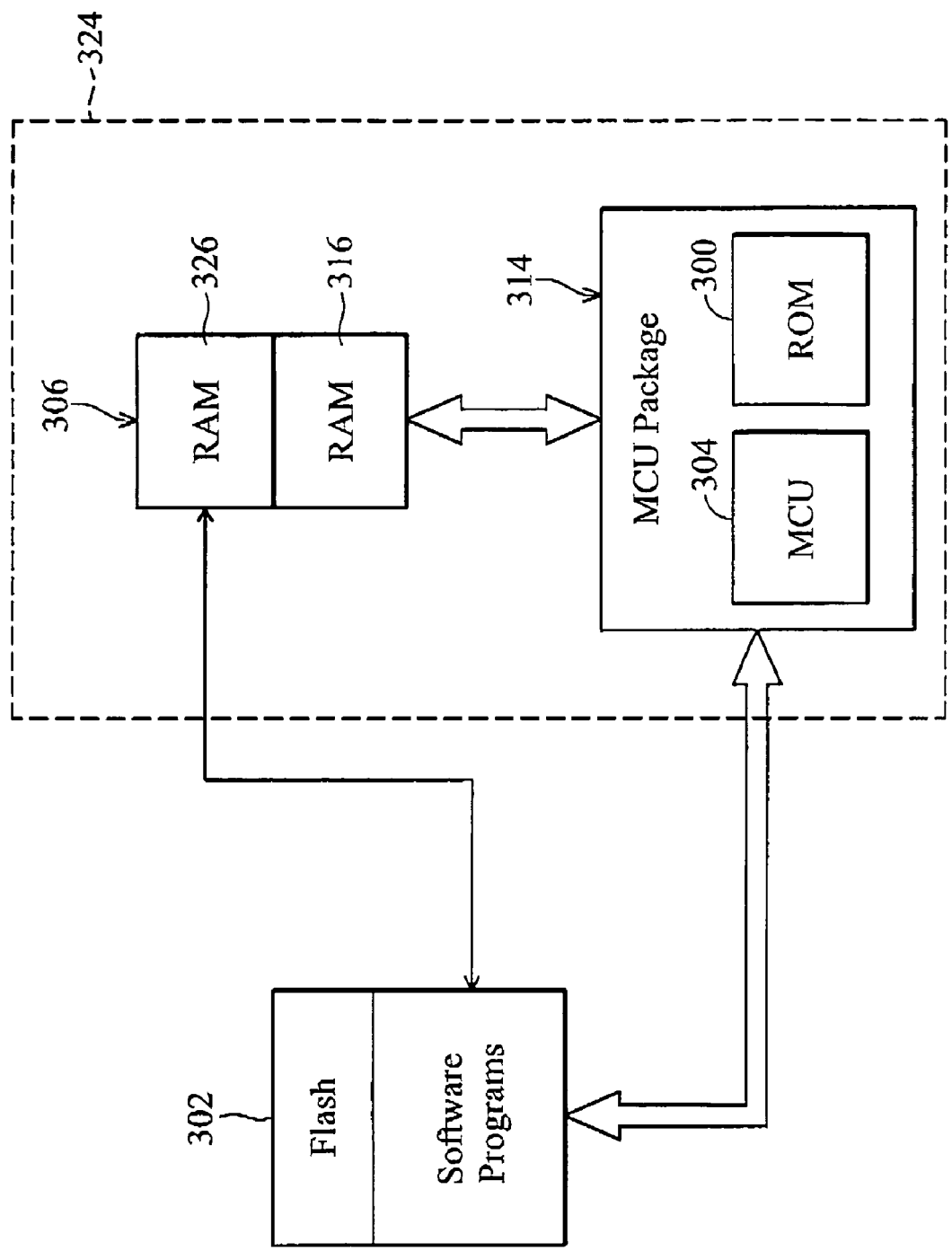
FIG. 3 is a diagram of an embodiment of a memory disposition system for a system.

Memory disposition systems are provided. FIG. 3 is a diagram of an embodiment of a memory disposition system. The memory disposition system comprises a first memory device 300 and a second memory device 302. The first and the second memory devices 300, 302, are coupled to a control unit 304 of the system. The control unit 304 can be a micro control unit (MCU).

The first memory device 300 stores first programs controlled by the control unit 304. The first memory device 300 is a one-time programmable memory device, such as a read-only-memory (ROM). The second memory device 302 stores second programs related to the first programs and controlled by the control unit 304. The relationship between the first and the second programs comprises data reference and function call. A function table is recorded in a fixed address in the second memory device 302 to accomplish data reference and function call. The second memory device 302 can be a multiple-time programmable memory device, such as a flash memory. Furthermore, the first memory device 300 can be integrated into the control unit 304. For example, a MCU package 314 is formed by the integration of the MCU 304 and the ROM 300 as illustrated in FIG. 3. If the ROM 300 is integrated into the MCU as a MCU package, the data access latency is reduced.

The memory disposition system may further include a third memory device 306. The third memory device 306 is coupled to the control unit 304 and stores third programs related to the first and second programs. The third memory device 306 can be a random-access-memory (RAM) divided into a first part 316 and a second part 326. The first part 316 stores programs related to the first programs and the second part 326 stores programs related to the second programs. In some other implementations, the RAM 306 can be integrated into the MCU package 314 to form a larger MCU package 324. Similarly, if the RAM is integrated into the MCU package 314 as a package 324, the accessing latency is reduced.

Also, in some embodiments, the function table can be recorded in a fixed address in the third memory device 306 to accomplish data reference and function call between the first and second memory devices 300, 302.

Figure 1:
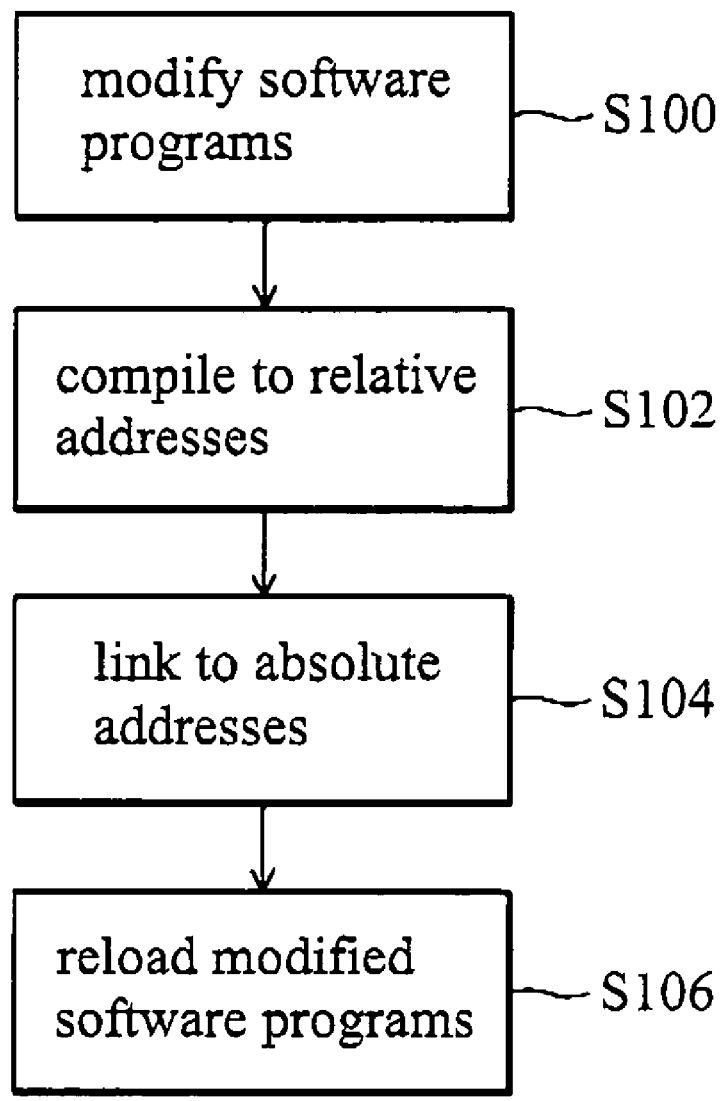
FIG. 1 is a flowchart of an embodiment of a conventional software program control method.
Figure 2:
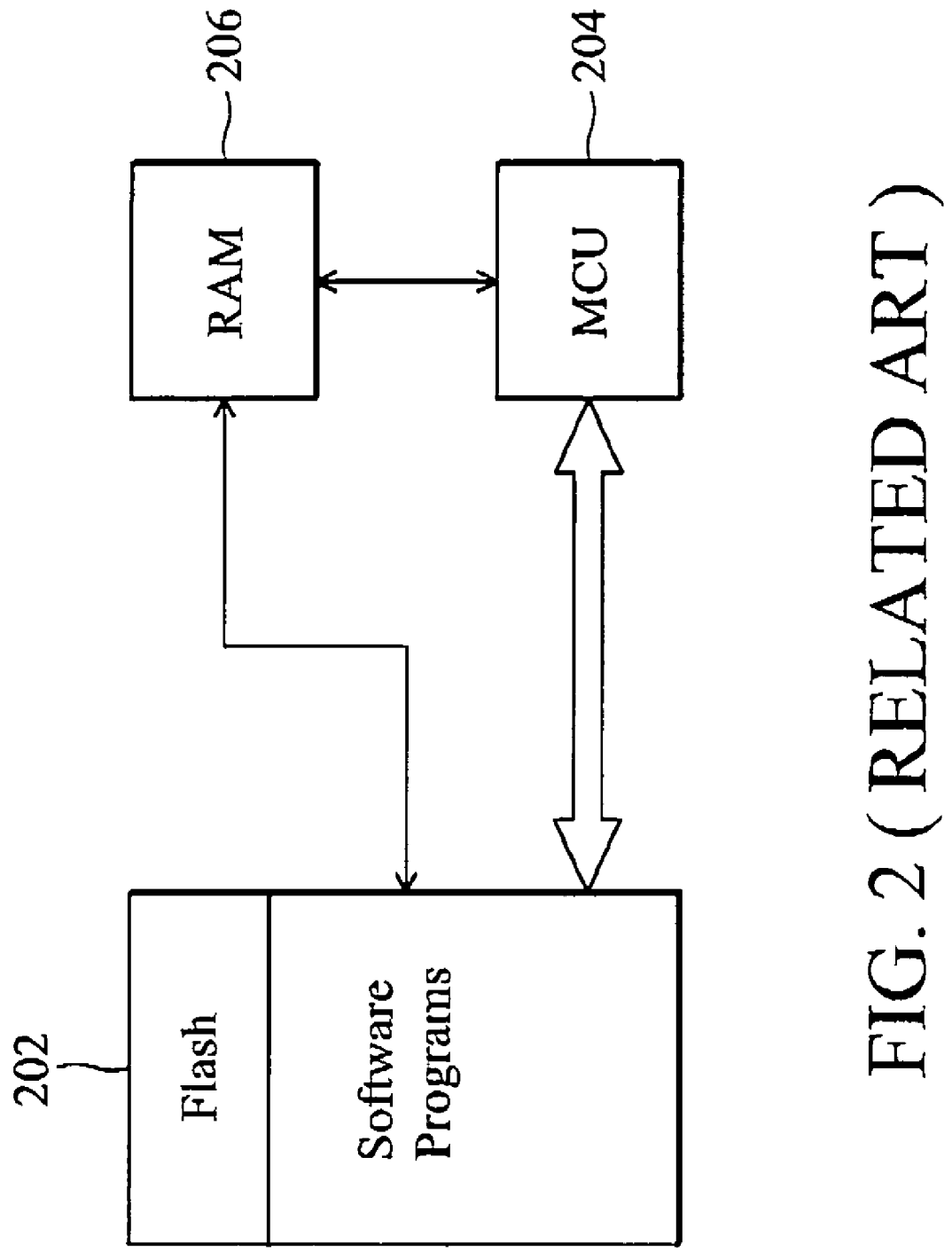
FIG. 2 is a diagram of an embodiment of a conventional software program control system.

Comparing FIG. 2 and FIG. 3, the size of the multiple-time programmable memory device is reduced in the inventive systems. Thus, costs are reduced and the programs in the multiple-time programmable memory device can be modified to satisfy specific requirements.

Figure 4:
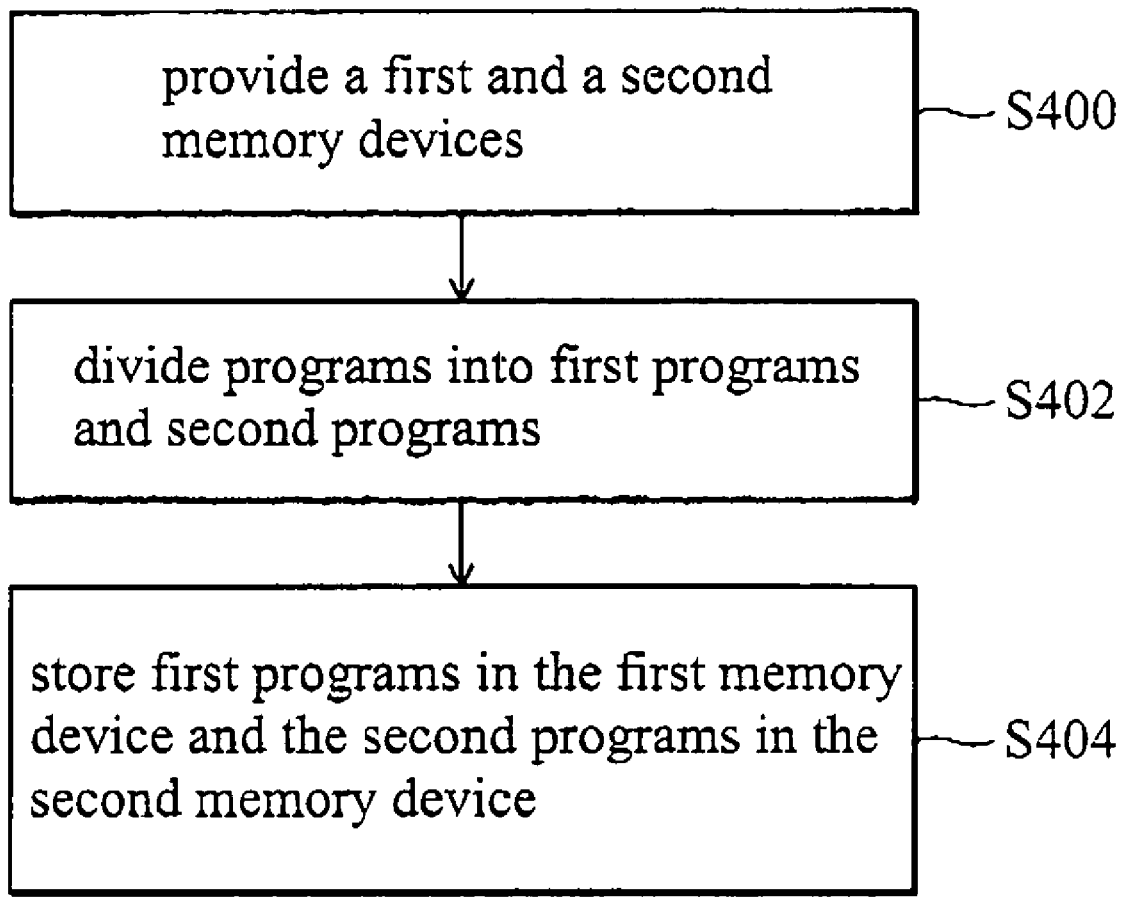
FIG. 4 is a flowchart of an embodiment of a memory disposition method for a system.

FIG. 4 is a flowchart of an embodiment of a memory disposition method for a system. A first memory device and a second memory device are provided (step S400). The first memory device can be a one-time programmable memory device, such as a ROM, and the second memory device a multiple-time programmable memory device, such as a flash memory. The first and the second memory devices are coupled to a control unit, such as a micro control unit, of the system. Also, the first memory device can be integrated into the control unit as a control unit package.

Programs controlled by the control unit are divided into first programs and second programs (step S402). The first programs are stored in the first memory device and the second programs in the second memory device (step S404). The relationship between the first and the second programs comprises data reference and function call. A function table is recorded in a fixed address in the second memory device 302 to accomplish data reference and function call. In some embodiments, the function table can be recorded in a fixed address in the third memory device 306 to accomplish data reference and function call between the first and second memory devices 300, 302.

In step S400, a third memory device, such as a RAM, may be additionally provided to store runtime data. The third memory device is coupled to the control unit and stores third programs, such as functions or data, related to the programs, including the first and second programs. The third memory device may be divided into a first part and a second part. The first part stores programs related to the first programs and the second part stores programs related to the second programs.

Figure 5:
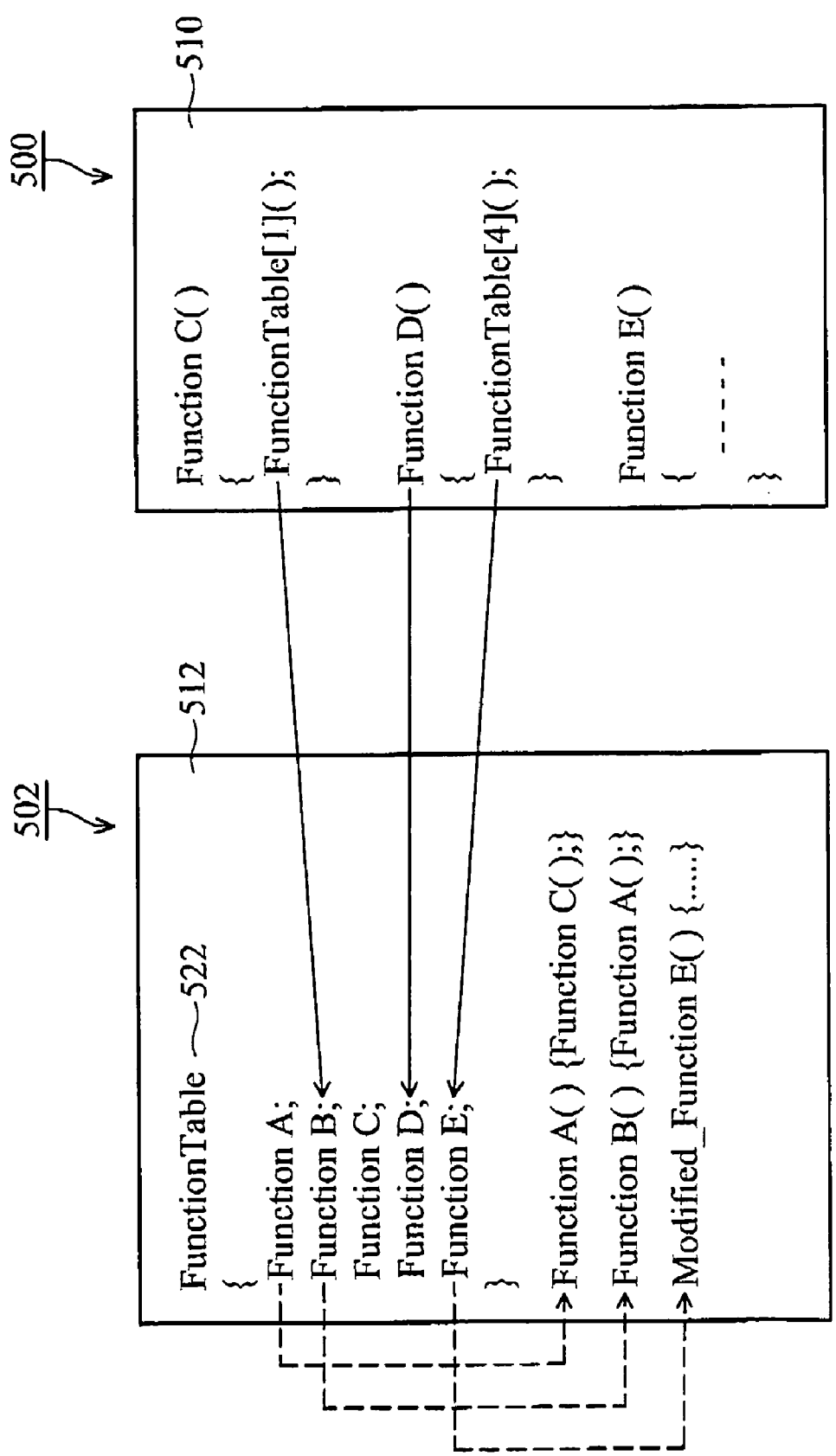
FIG. 5 is a diagram of an exemplary embodiment of a memory disposition method for a system.

FIG. 5 is a diagram of an exemplary embodiment of a memory disposition method for a system. In the example, an embedded system with a MCU includes first and second memory devices. The first memory device 500 is a ROM and the second memory device 502 is a flash memory. The first and second memory devices are coupled to the MCU.

Programs controlled by the MCU are divided into first programs 510 and second programs 512. The first programs 510 are stored in the first memory device 500 and the second programs 512 in the second memory device 502. The relationship between the first and second programs includes data reference and function call. A function table 522 is recorded in a fixed address in the second memory device 502 to accomplish mentioned data reference and the function call. In some embodiments, the function table can be recorded in a fixed address in the third memory device 306 to accomplish data reference and function call between the first and second memory devices 300, 302.

For example, as shown in FIG. 5, the first programs 510 include Function C, Function D, and Function E, while the second programs include Function A and Function B. A function table 522 is stored in a fixed address of the flash memory 502 and records positions of Function A, B, C, D, and E by using pointers to separately point to Function A, B, C, D, E. Therefore, the function table 522 comprises five items, separately represented as Function Table [0], [1], [2], [3], and [4], and separately having a pointer directing to Function A, B, C, D, and E.

For the first programs, Function C, D, E, it is required to utilizing the function table 522 for calling other functions. For example, Function C includes the programming of "call Function B". Because Function B is stored in the flash memory and capable of being modifying, the address of Function B in the flash memory can be changed due to the modification. If Function C performs the operation of function calling by directly calling Function B, the correct address of Function B has to be programmed in the ROM. However, the address of Function B in the flash memory can be changed due to modification and the address of Function B programmed in the ROM cannot be modified to be the changed one. This will make the calling of Function B failed because of the wrong address information.

Therefore, the invention is designed that Function C has to utilize the function table 522 for calling Function B, rather than directly calling Function B. In order to call Function B, Function C has the programming of "FunctionTable [1]," making it go to the function table 522 for the second item and then be directed to Function B for function calling. Since the flash memory 502 can be reprogrammed, the second item of function table 522 can be modified to record the updated address of Function B after Function B is modified. Function C can successfully call Function B via the function table 522, directing to the correct address of Function B.

Since the function table 522 is stored in a fixed address of the flash memory 502, the address information about the items of the function table will not be changed. This ensures that the address information programmed in the ROM 500 is always correct, and the first programs 510, such as Function C, can go to the second item of the function table 522 to be directed to Function B, and successfully call Function B, regardless of whether the address of Function B is changed or not.

Furthermore, when Function E has to be updated, the modified one, Modified_Function E, has to be stored in the flash memory 502 since the ROM 500 cannot be re-programmed. In this situation, the pointer of the fifth item of the function table 522, Function Table [4], will point to the modified one, Modified_Function E, which is stored in the flash memory 502, rather than the old one in the ROM 500. Therefore, Function D having the programming of "Function Table [4]" will be directed to Modified_Function E for calling function.

Compared with the first programs 510 in the ROM 500, the second programs 512 in the flash memory 502 are designed to call other functions directly, without referring the function table 522. For example, Function B contains the programming of "Function A" for directly calling Function A. When the Function A is modified to be stored in a new address in the flash memory, the programming of Function B can be modified to record the new address of Function A since the flash memory 502 can be re-programmed.

As shown in FIG. 5, Function A contains the programming of "Function C" for directly calling Function C. Similarly, once Function C has to be updated, the modified one will be stored in the flash memory 502. By recording the new address of Function C in the programming of Function A, Function A can successfully calling Function C without failure.

In summary, the first programs 510 refer to the function table 522 to acquire the actual address of other functions, regardless of the functions being stored in the flash memory 502 or the ROM 500, when performing function calling. Thus, cross-reference function calls between the first and second memory devices are accomplished.

On the other hand, because the second memory device 502 is a multiple-time programmable memory device, the programs can be modified. For example, an original Function E is stored in the first programs 510 of the first memory device 500. The Function E requires modification for specific requirements. A modified Function E is stored in the second programs 512 of the second memory device 502 because the second memory device 502 is multiple-time programmable. Thereafter, when Function D calls Function E in programs, the first programs refer to the function table 522, indicating the modified Function E. The modified Function E is executed thereafter. Thus, the software program modification is accomplished by the second memory device.

Methods and systems of the present disclosure, or certain aspects or portions of embodiments thereof, may take the form of program code (i.e., instructions) embodied in media, such as floppy diskettes, CD-ROMS, hard drives, firmware, or any other machine-readable storage medium, wherein, when the program code is loaded into and executed by a machine, such as a computer, the machine becomes an apparatus for practicing and embodiment of the disclosure. The methods and apparatus of the present disclosure may also be embodied in the form of program code transmitted over some transmission medium, such as electrical wiring or cabling, through fiber optics, or via any other form of transmission, wherein, when the program code is received and loaded into and executed by a machine, such as a computer, the machine becomes an apparatus for practicing and embodiment of the disclosure. When implemented on a general-purpose processor, the program code combines with the processor to provide a unique apparatus that operates analogously to specific logic circuits.

While the invention has been described by way of example and in terms of preferred embodiment, it is to be understood that the invention is not limited thereto. Those skilled in this technology can still make various alterations and modifications without departing from the scope and spirit of this invention. Therefore, the scope of the present invention shall be defined and protected by the following claims and their equivalents

What is claimed is:

1. A memory disposition system, comprising:
a first memory device, coupled to a control unit of a system, storing first programs controlled by the control unit, wherein the first memory device is a one-time programmable non-volatile memory device; and
a second memory device, coupled to the control unit, storing second programs related to the first programs and controlled by the control unit, wherein the second memory device is a multiple-time programmable non-volatile memory device,
wherein the relationship between the first and the second programs comprises data reference and function call.

2. The memory disposition system as claimed in claim 1, further comprising a third memory device, coupled to the control unit, wherein the third memory unit stores third programs related to the first and the second programs.

3. The memory disposition system as claimed in claim 2, wherein a function table is recorded in a fixed address in the second memory device or the third memory device to accomplish the data reference and the function call.

4. The memory disposition system as claimed in claim 3, wherein if the function call is comprised in the first programs, the function call is accomplished by retrieving addresses from the function table and branching to the retrieved addresses.

5. The memory disposition system as claimed in claim 2, wherein if the function call is comprised in the second programs, the function call is accomplished directly by branching to the retrieved addresses.

6. The memory disposition system as claimed in claim 2, wherein the third memory device is a random-access-memory.

7. The memory disposition system as claimed in claim 2, wherein the third memory device is divided into a first part and a second part, the first part storing programs related to the first programs and the second part storing programs related to the second programs.

8. The memory disposition system as claimed in claim 2, wherein the third memory device is integrated into the control unit.

9. The memory disposition system as claimed in claim 1, wherein the control unit is a micro control unit.

10. The memory disposition system as claimed in claim 1, wherein the first memory device is a read-only-memory.

11. The memory disposition system as claimed in claim 1, wherein the second memory device is a flash memory.

12. The memory disposition system as claimed in claim 1, wherein the first memory device is integrated into the control unit.

13. A memory disposition method, comprising:
providing a first memory device and a second memory device, coupled to a control unit of a system, wherein the first memory device is a one-time programmable non-volatile memory device and the second memory device is a multiple-time programmable non-volatile memory device;
dividing programs into first programs and second programs, wherein the first and the second programs are controlled by the control unit; and
storing the first programs in the first memory and the second programs in the second memory device,
wherein the relationship between the first and the second programs comprises data reference and function call.

14. The memory disposition method as claimed in claim 13, further providing a third memory device, coupled to the control unit, wherein the third memory device stores third programs related to the programs.

15. The memory disposition method as claimed in claim 14, wherein a function table is recorded in a fixed address in the second memory device or the third memory device to accomplish the data reference and the function call.

16. The memory disposition method as claimed in claim 15, wherein if the function call is comprised in the first programs, the function call is accomplished by retrieving addresses from the function table and branching to the retrieved addresses.

17. The memory disposition method as claimed in claim 15, wherein if the function call is comprised in the second programs, the function call is accomplished directly by branching to the retrieved addresses.

18. The memory disposition method as claimed in claim 14, wherein the third memory device is a random-access-memory.

19. The memory disposition method as claimed in claim 14, further dividing the third memory device into a first part and a second part, wherein the first part stores programs related to the first programs and the second part stores programs related to the second programs.

20. The memory disposition method as claimed in claim 14, wherein the third memory device is integrated into the control unit.

21. The memory disposition method as claimed in claim 13, wherein the control unit is a micro control unit.

22. The memory disposition method as claimed in claim 13, wherein the first memory device is a read-only-memory.

23. The memory disposition method as claimed in claim 13, wherein the second memory device is a flash memory.

24. The memory disposition method as claimed in claim 13, wherein the first memory unit is integrated into the control unit.

25. A memory disposition system, comprising:
- a first memory device, coupled to a control unit of a system, storing first programs controlled by the control unit, wherein the first memory device is a one-time programmable non-volatile memory device;
- a second memory device, coupled to the control unit, storing second programs related to the first programs and controlled by the control unit, wherein the second memory device is a multiple-time programmable non-volatile memory device; and
- a third memory device, coupled to the control unit, wherein the third memory unit stores third programs related to the first and the second programs and is a random-access-memory, wherein the relationship between the first and the second programs comprises data reference and function call.

* * * * *